US008540835B2

(12) United States Patent
Thomasset

(10) Patent No.: US 8,540,835 B2
(45) Date of Patent: *Sep. 24, 2013

(54) METHOD FOR MANUFACTURING TUBES BY WELDING

(75) Inventor: Jacques Thomasset, Vouvry (CH)

(73) Assignee: Aisapack Holdings S.A., Vouvry (CH)

( * ) Notice: Subject to any disclaimer, the term of this patent is extended or adjusted under 35 U.S.C. 154(b) by 272 days.

This patent is subject to a terminal disclaimer.

(21) Appl. No.: 12/677,185

(22) PCT Filed: Jul. 26, 2008

(86) PCT No.: PCT/IB2008/053013
§ 371 (c)(1),
(2), (4) Date: Apr. 12, 2010

(87) PCT Pub. No.: WO2009/034485
PCT Pub. Date: Mar. 19, 2009

(65) Prior Publication Data
US 2010/0193125 A1 Aug. 5, 2010

(30) Foreign Application Priority Data
Sep. 13, 2007 (EP) .................................... 07116384

(51) Int. Cl.
*B29C 53/50* (2006.01)
*B29C 53/52* (2006.01)
*B29C 55/24* (2006.01)

(52) U.S. Cl.
USPC ........... 156/203; 156/218; 156/229; 156/466; 156/494

(58) Field of Classification Search
USPC ................. 156/203, 229, 466, 494, 495, 496, 156/218; 53/455, 550, 551
See application file for complete search history.

(56) References Cited

U.S. PATENT DOCUMENTS

| 3,260,636 | A | * | 7/1966 | Witzenmann | 156/203 |
| 4,469,542 | A | * | 9/1984 | Reil | 156/203 |
| 5,310,443 | A | * | 5/1994 | Burger | 156/466 |

FOREIGN PATENT DOCUMENTS

| CH | 695 937 | 10/2006 |
| DE | 81 03 868 | 5/1981 |
| WO | 2004/039561 | 5/2004 |
| WO | 2006/029835 | 3/2006 |

OTHER PUBLICATIONS

English Translation of Written Opinion (IPRP Chapter I) for PCT/IB2008/053013, mailed Dec. 19, 2008.
International Search Report for PCT/IB2008/053013, mailed Dec. 19, 2008.

* cited by examiner

*Primary Examiner* — Michael Tolin
(74) *Attorney, Agent, or Firm* — Nixon & Vanderhye P.C.

(57) ABSTRACT

The invention concerns a method of welding a laminate for the production of flexible tubular plastic bodies. The method comprises the following operations: a laminate is shaped around a welding tool, the ends of the laminate to be welded are heated, the ends are pressed together and at least partly cooled, the welded zone is deformed so as to increase its area, and the weld zone is cooled. The invention also concerns a device that is suitable for using the method mentioned above.

12 Claims, 2 Drawing Sheets

METHOD FOR MANUFACTURING TUBES BY WELDING

This application is the U.S. national phase of International Application No. PCT/IB2008/053013, filed Jul. 26, 2008, which designated the U.S. and claims priority to European Application No. 07116384.4, filed Sep. 13, 2007, the entire contents of each of which are hereby incorporated by reference.

FIELD OF THE INVENTION

The invention relates to the manufacture of flexible packaging by the welding of plastic films. More specifically, the invention relates to the production of flexible tubes intended for storing and delivering liquid or pasty products.

PRIOR ART

Flexible tubes consisting of a head and a flexible skirt obtained by welding a web called a "laminate", the laminate being formed from several plastic or metal layers, are known. These skirts are obtained by unwinding a web, by forming the web into a tubular body, by welding the ends of the web together, generally forming a slight overlap, and finally by cutting the tubular body into segments of identical length. A tube head is then welded or molded onto the end of said skirt. The tube head includes a neck with an orifice and a shoulder that joins the neck to said skirt. The tube is thus delivered to the filler, head down and with the delivery orifice closed off (for example by a screwed cap) so as to be filled via that end of the tube which has remained open. Once the tube has been filled, said end is closed by pinching and welding the film to itself.

One difficulty encountered when producing flexible tubes by welding lies in the deformation of the skirt during the welding operation. Often the skirts produced do not have a perfectly circular geometry, as is desirable, but instead a cross section in the form of a "pear" or of a "water drop". These out-of-roundness defects are particularly prejudicial to the joining and tube-filing operations. The operation of joining the skirt to the head by welding requires the head to be inserted into the skirt, which operation is all the more difficult the greater the out-of-roundness defect. During filling, the filler must introduce a nozzle via that end of the tube which has remained open. This operation is greatly disturbed when the cross section of the tube is not circular.

The out-of-roundness of the skirts has an influence on the final geometry of the tube and in many cases the out-of-roundness defects impair the aesthetic properties of the packaging. For this reason, it is desirable to have perfectly circular skirts.

Patent Application WO 2004/039561 proposes to deform the laminate beyond the elastic limit prior to the welding operation. A first method proposed in Application WO 2004/039561 consists in thinning the web by about 1% by calendering. A force of between 2.5 and 500 newtons per millimeter width of the web must be applied. When the web comprises more than 70% plastic by volume, it is suggested heating said web before calendering to a temperature between 75 and 120° C. A second method proposed in Application WO 2004/039561 consists in carrying out an embossing operation, resulting in the creation of raised features and of hollows, the amplitude of which is preferably between $1/15$ and 3 times the thickness of the web. This calendering or embossing operation should have the effect of modifying the residual stresses in the laminate. According to the inventors, this method makes the elastic behavior of the web uniform and in the case of embossing it is possible to increase the strength of the web in the longitudinal direction and in the cross direction. However, the method proposed in Patent Application WO 2004/039561 has several drawbacks. It cannot easily be used with printed webs and in particular when the printing is on the surface. This is because the calendering or embossing operation tends to damage the printing owing to the deformation, temperature and friction generated by the method.

Another method for improving the roundness of the tubes is proposed in Swiss Patent Application CH 695 937 A5. This method consists in carrying out a heat treatment on the tubular body before it is cut into segments of identical length. The tubular body is produced according to the prior art, the welding method comprising in particular: a shaping step, in which the web is wound around a welding rod in order to form a cylindrical body; a heating step in order to melt the ends of the web to be welded together; a step of pressing the ends to be welded together; and a step of cooling the welded zone. Application CH 695 937 A1 then proposes to carry out a heat treatment on the tubular body before it is cut into segments of identical length. The heat treatment consists in making the temperature of the tubular body uniform by means of a fluid in contact with the outer surface of the tube. The device serving to carry out the heat treatment is inserted between the welding device and the cutting device. One drawback of the method proposed in Application CH 695 937 A5 is due to the time needed to carry out an effective heat treatment. This time is longer the greater the thickness of the laminate, so that the proposed method proves to be unsuitable for thick laminates and for high production rates.

GENERAL DESCRIPTION OF THE INVENTION

The invention consists of a welding method for producing tubular bodies of improved roundness by welding a laminate. This welding method is characterized in that the welded zone undergoes a deformation so as to increase its area.

The welding method according to the invention comprises the following steps:
 a laminate is shaped around a welding rod ;
 the ends of the laminate to be welded together are heated;
 said ends are pressed together;
 the welded zone is deformed so as to increase its area; and
 the welded zone is cooled.

In the description of the invention, the expression "welded zone" represents that part of the laminate which is heated, compressed and cooled in the welding method. The welded zone is not limited to that part of the laminate forming the welded overlap, rather it constitutes that part of the laminate which is thermally affected by the welding operation.

The term "laminate" is understood to mean a sheet formed from several plastic or metal layers, which is obtained by lamination.

The term "deformation" is understood to mean a modification of the shape of the welded zone, causing the area of the welded zone to be increased.

Advantageously, between the step of pressing the ends together and the step of deforming the welded zone, the ends are cooled, without however reaching the ambient temperature.

According to a preferred embodiment, the welded zone is elongated in the longitudinal direction, i.e. in a direction parallel to the axis of the tube.

According to a second embodiment, the welded zone is elongated transversely, i.e. in a direction perpendicular to the axis of the tube.

A third embodiment consists in combining the longitudinal and transverse elongations of the welded zone.

The deformation of the welded zone compensates for the shrinkage of said zone and relaxes the stresses associated with said shrinkage. The tubes obtained have a high roundness.

The operation of elongating the welded zone takes place after the ends to be welded together have been heated and before the tube is cooled to the ambient temperature. Preferably, the deformation operation takes place before the tubular body is cut into segments of identical length.

Advantageously, the deformation operation consists in increasing the area of the welded zone by an amount corresponding to the shrinkage of said zone due to the effect of the heating and cooling. This amount depends on the properties of the laminate and in particular of the constituent films of said laminate. For a laminate shrinking substantially in the longitudinal direction, the deformation of the welded zone may be as much as 1 to 2%.

Preferably, the welding method consists in tempering the entire tubular body.

Advantageously, the tubular body is tempered as a temperature between 50 and 95° C. during the deformation of the welded zone.

A variant of the invention consists of a post-treatment of the welded tube, said post-treatment comprising at least one operation of elongating the welded zone.

The invention will be better understood from the following figures.

DETAILED DESCRIPTION OF THE INVENTION

Figure 1:
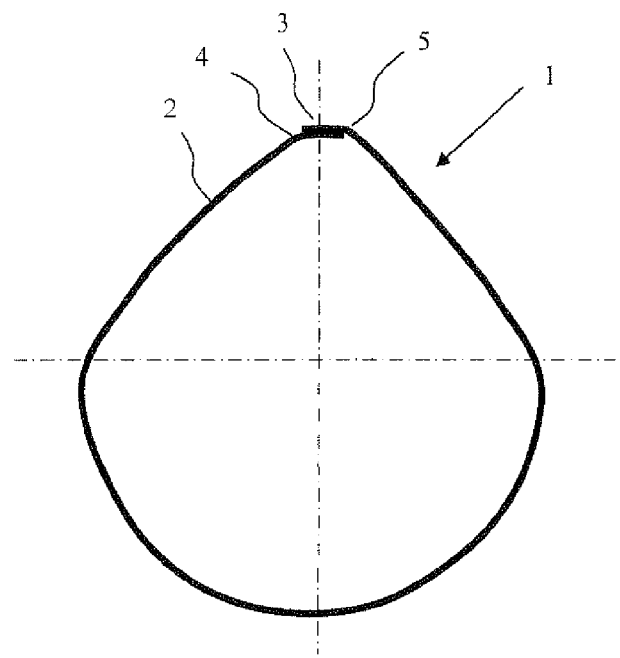
FIG. 1 illustrates a tubular body obtained by welding a thermoplastic laminate, the cross section of which has out-of-roundness defects.

FIG. 1 illustrates the cross section of a tubular body having out-of-roundness defects which the invention is able to remedy. The cross-sectional defects result from the production of the tubular body by welding using the methods known in the prior art and without operations, prior to or after the welding method, as described in Patents WO 2004/039561 and CH 695 937 A5. The tubular body 1 results from the welding of a laminate 2, the welded ends of which form an overlap in the welded zone 3. Out-of-roundness defects 4 and 5 are observed close to the welded zone 3 and overall affect the roundness of the tubular body. The invention also makes it possible to improve the roundness of a tubular body formed by butt-welding the ends of a laminate together.

It is observed that the out-of-roundness defects 4 and 5 appear during the welding method and in particular while the welded zone is being cooled. It is also observed that the welding defects appear during cooling and are associated with the thermal shrinkage of the welded zone, said shrinkage having the effect of generating stresses and of deforming the circular cross section.

The invention consists of a welding method that makes it possible to compensate for the shrinkage of the welded zone and thus to prevent the generation of stresses which deform the tubular body. To do this, the welding method comprises, in addition to the standard heating, compression and cooling operations, an operation of elongating the welded zone. The elongation of the welded zone is advantageously carried out during cooling, when the welded zone is strong enough to be elongated, but before the welded zone is completely cooled. The stretching operation consists in elongating the welded zone by an amount corresponding to the shrinkage of said zone under the effect of the heating and cooling. This amount depends on the properties of the laminate and in particular of the constituent films of said laminate. For a laminate shrinking substantially in the longitudinal direction, the elongation of the welded zone may be as much as 1 to 2%.

In addition to the operation of elongating the welded zone, it is advantageous to reduce the temperature difference between the welded zone and the rest of the tubular body. It has been found that by reducing this temperature difference it is possible to delay the appearance of stresses associated with the shrinkage of the welded zone and thus to delay the operation of elongating the welded zone. It is favorable to elongate the welded zone when the temperature of said zone is close to the temperature of the rest of the tubular body. In the production of PE (polyethylene) tubular bodies, this temperature is between 50 and 95° C. and preferably between 60 and 80° C.

The operation of elongating the welded zone takes place after the ends to be welded together have been heated, but before the tube is cooled to the ambient temperature. Advantageously, the stretching operation is performed before the tubular body is cut into segments of identical length. In a continuous welding method, starting from a laminate wound in the form of a reel, the invention consists: in unwinding the laminate; in shaping the laminate around a welding rod; in heating the ends of the laminate which are intended to be welded together; in compressing the ends to be welded together against each other; in at least partly cooling the welded zone; in elongating the welded zone; and in cutting up the tubular body into cylindrical skirts intended to be joined to heads. The laminate is tempered during the welding operation so as to reduce the thermal gradient between the welded zone and the laminate forming the non-welded part of the tubular body. The laminate may be easily heated by means of the welding rod around which the laminate is shaped. Another method for tempering the laminate consists in using hot air, which is blown onto the external or internal surface of the laminate. For laminates that include an aluminum foil, the laminate may be heated by inducing currents in the aluminum foil.

Figure 2:
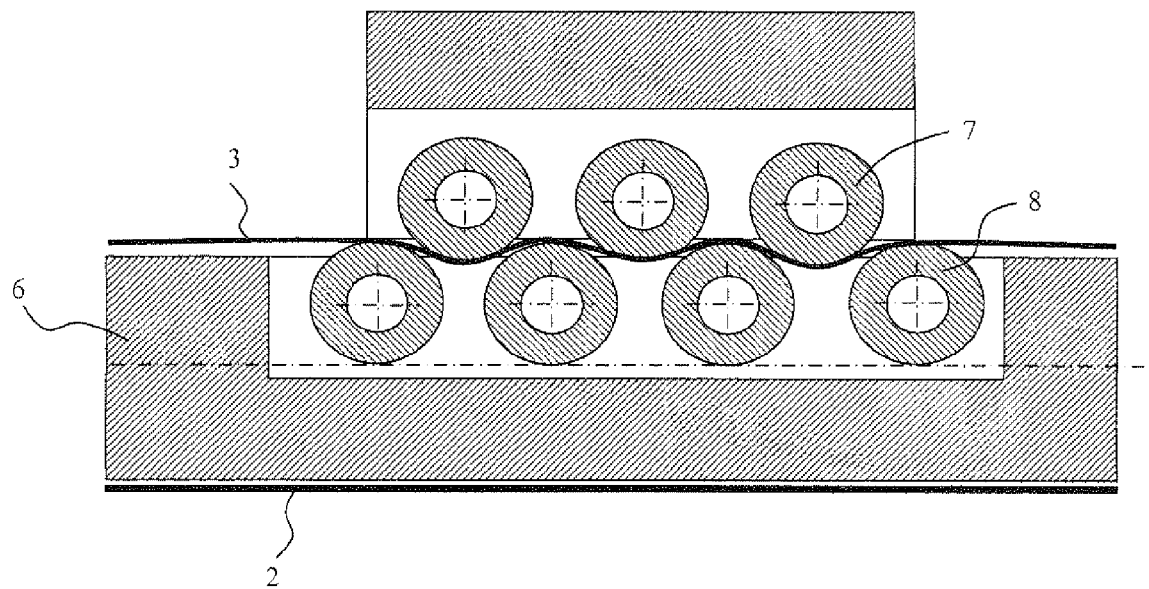
FIG. 2 illustrates a device for elongating the welded zone in the longitudinal direction.

The first embodiment of the invention consists of a welding method that includes an operation of elongating the welded zone in the longitudinal direction, i.e. in a direction perpendicular to the cross section of said tubular body. A first example for elongating the welded zone in a method in which the laminate moves at a constant speed over a welding rod, consists in varying the speed of the welding zone. This speed variation is obtained for example by means of a device made up of drive rollers located in the welding zone, the rotation speed differential of which has the effect of elongating the welded zone. A second example of the method and device for elongating the welded zone in the longitudinal direction is illustrated in FIG. 2. This device, inserted into a welding rod, is illustrated in a cross-sectional view of the welding rod 6, said cross-sectional view being parallel to the axis of the rod. This device is formed from a set of rollers 7 external to the rod and of rollers 8 housed in the rod which act together to elongate the welded zone 3. Only the welded zone 3 is elongated—the laminate 2 forming the tubular body is not deformed. The elongation of the welded zone 3 is adjusted by the pressure exerted by the rollers 7, said pressure having the effect of modifying the path of the welded zone 3. The number and diameter of the rollers 7 and 8 are adjusted according to the laminate and according to the welding speed. The width of the rollers 7 and 8 is adjusted according to the width of the welded zone.

Figure 3:
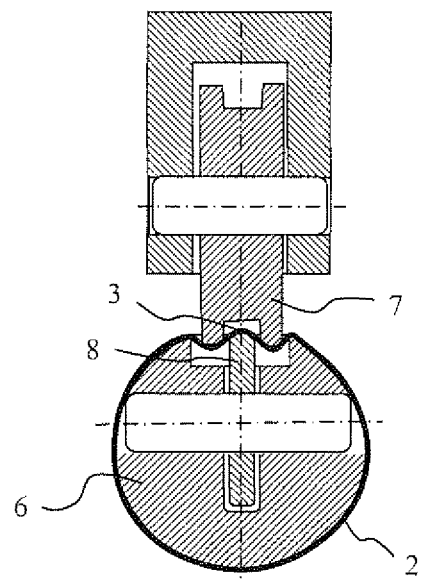
FIG. 3 illustrates a device for elongating the welded zone in the transverse direction.

A second embodiment of the invention consists of a welding method that includes an operation of elongating the welded zone in the transverse direction, i.e. in a direction perpendicular to the axis of the tube. An example of a device for elongating the welded zone in the transverse direction is illustrated in FIG. 3. This device, inserted into a welding rod, is illustrated in a cross-sectional view of the welding rod 6, said cross section being perpendicular to the axis of the rod. This device is formed from a set of rollers 7 external to the rod and of rollers 8 housed in the rod which act together to elongate the welded zone 3. Only the welded zone 3 is elongated, the laminate 2 forming the tubular body not being deformed. The elongation of the welded zone 3 is adjusted via the pressure exerted by the rollers 7, said pressure having the effect of transversely elongating the welded zone 3. The number and diameter of the rollers 7 and 8 are adjusted according to the laminate and according to the welding speed. The width of the rollers 7 and 8 is adjusted according to the width of the welded zone, A third embodiment of the invention consists in elongating the welded zone 3 longitudinally and transversely. The third embodiment may be implemented by the sequential use of the devices illustrated in FIGS. 3 and 4. A device enabling simultaneous longitudinal and transverse elongation may also be used.

Figure 4:
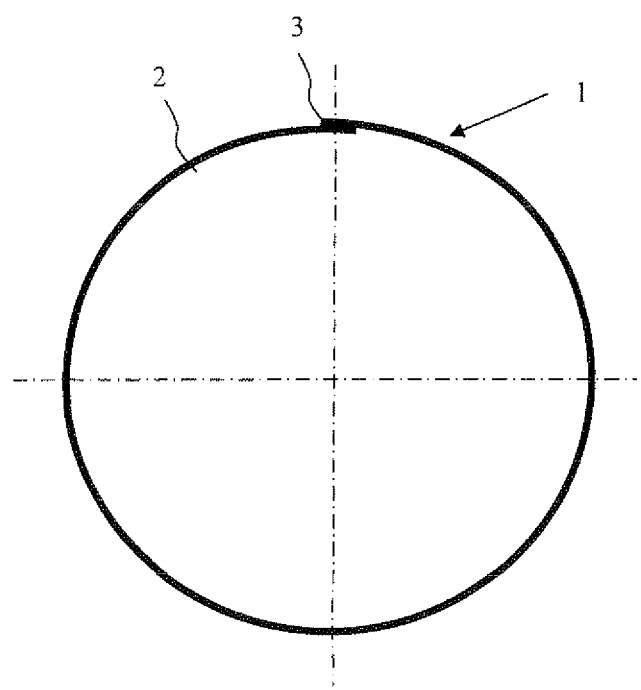
FIG. 4 illustrates the cross section of the tube obtained by applying the method described in the invention.

The first, second and third embodiments of the invention make it possible to compensate for the shrinkage of the welded zone during cooling and to prevent the shrinkage stresses that deform the tubular body. After elongation, the tubular body, the temperature of which is preferably uniform over its entire circumference, is cooled to the ambient temperature uniformly. This results in a tubular body having no out-of-roundness defect. The cross section of this tubular body is illustrated in FIG. 4, in which the out-of-roundness defects close to the welding zone 3 have been eliminated.

In a manufacturing method in which the laminate is not moving during the welding operation, many devices applying tension to the welded zone may be used to create the deformation. These devices consist in blocking one end of the welded zone and in pulling on the other end. Most of the tensioning principles and mechanisms can be adapted so as to carry out this operation.

Within the context of the invention, it is generally preferable to deform only the welded zone, in particular when the laminate is printed, since the operation of deforming the laminate in its entirety may have the effect of damaging the printing. However, in certain cases the tube may be elongated in its entirety.

A variant of the invention consists of a post-treatment of the welded tube, said post-treatment comprising at least one operation of elongating the welded zone. The post-treatment operation consists: in heating the tubular body uniformly to a temperature between 60 and 95° C.; in elongating the welded zone; in shaping the tubular body; and in cooling the tubular body. The elongation of the welded zone may be longitudinal and/or transverse. The shaping operation consist in giving the tubular body a circular cross section, it being possible for the shaping operation to be carried out by applying an internal pressure, by applying an external vacuum or by use of a mandrel.

The roundness of the tubular body obtained according to the method described in the invention is improved, as shown in FIG. 4. This tubular body 1 is formed from a laminate 2, the ends of which have been welded together. The invention applies to the lap welding or to the butt welding of the ends.

The invention claimed is:

1. Method of welding a laminate for the production of flexible tubular plastic bodies, which method comprises the following operations:
   a laminate, having ends, is shaped around a welding rod;
   the ends of the laminate to be welded are heated;
   said ends are pressed together and at least partly cooled to form a welded zone;
   the welded zone is deformed so as to increase its area; and
   the welded zone is cooled after being deformed.

2. Method according to claim 1, wherein, between the step of pressing the ends together and the step of deforming the welded zone, the ends are cooled, without reaching an ambient temperature.

3. Method according to claim 1, wherein the welded zone is elongated in a direction parallel to an axis of the tube.

4. Method according to claim 1, wherein the welded zone is elongated in a direction perpendicular to an axis of the tube.

5. Method according to claim 4, wherein the welded zone is elongated in a direction parallel to the axis of the tube and in a direction perpendicular to the axis of the tube.

6. Method according to claim 1, which includes a step, after the step of cooling the welded zone, of cutting the tubular body thus formed into several identical segments.

7. Method according to claim 1, wherein the deformation of the welded zone corresponds approximately to the shrinkage of said zone under the effect of the heating and cooling.

8. Method according to claim 1, wherein the laminate is tempered.

9. Method according to claim 8, wherein the laminate is tempered, during the step of deforming the welded zone, at a temperature between 50 and 95° C.

10. Device for the production of a flexible tubular plastic body from a laminate having ends, wherein the device comprises a welding rod, heating means suitable for heating the ends of the laminate placed around said welding rod, and a set of (a) external rollers that are external to the welding rod and (b) internal rollers housed in the welding rod, and wherein the set of external rollers and internal rollers act together to elongate a welded zone of the laminate.

11. Device according to claim 10, wherein the external and internal rollers are designed to deform said welding zone in a direction parallel to an axis of the welding rod.

12. Device according to claim 10, wherein the external and internal rollers are designed to deform said welding zone in a direction perpendicular to an axis of the welding rod.

* * * * *